United States Patent [19]

Kanehori et al.

[11] Patent Number: 4,555,456
[45] Date of Patent: Nov. 26, 1985

[54] CATHODE STRUCTURE FOR THIN FILM BATTERY

[75] Inventors: Keiichi Kanehori, Sayama; Katsuki Miyauchi, Hino; Yukio Ito, Sayama; Fumiyoshi Kirino, Suginami; Tetsuichi Kudo, Setagaya, all of Japan

[73] Assignee: Hitachi, Ltd., Tokyo, Japan

[21] Appl. No.: 612,857

[22] Filed: May 22, 1984

[30] Foreign Application Priority Data

May 26, 1983 [JP] Japan ................................. 58-91438

[51] Int. Cl.$^4$ ......................... H01M 2/14; H01M 4/58
[52] U.S. Cl. ...................................... 429/131; 429/218
[58] Field of Search ............................... 429/218, 131

[56] References Cited

U.S. PATENT DOCUMENTS

| 4,007,055 | 2/1977 | Whittingham | 423/561 R X |
| 4,041,140 | 8/1977 | Nitta et al. | 423/561 R |
| 4,084,046 | 4/1978 | Whittingham | 429/194 |
| 4,323,480 | 4/1982 | Dines et al. | 502/215 |
| 4,464,447 | 8/1984 | Lazzari et al. | 429/194 |

Primary Examiner—Brian E. Hearn
Assistant Examiner—Stephen J. Kalafut
Attorney, Agent, or Firm—Antonelli, Terry & Wands

[57] ABSTRACT

A cathode structure for a thin film battery in which a titanium oxide layer is disposed on a substrate and has a titanium disulfide thin film disposed thereon. The cathode structure exhibits an excellent performance when applied to a lithium battery, a sodium battery, etc.

7 Claims, 2 Drawing Figures

CATHODE STRUCTURE FOR THIN FILM BATTERY

BACKGROUND OF THE INVENTION

The present invention relates to a cathode structure for a thin film battery. More particularly, it relates to a cathode structure whose active material is titanium disulfide.

As to employing titanium disulfide (hereinbelow written as "$TiS_2$") for the cathode thin film of a thin film battery, several attempts have heretofore been made (for example, U.S. Pat. No. 4,203,861). In such attempts, however, a pressed compact of $TiS_2$ powder is attached to a current collector, and a structure suited electrochemically is not especially contrived.

In addition, a method of manufacturing $TiS_2$ has been known from Japanese Laid-Open Patent Application No. 56-84318. In this method, the produced $TiS_2$ is merely collected so as to be used for a desired purpose.

SUMMARY OF THE INVENTION

An object of the present invention is to provide a cathode structure having $TiS_2$ thin film which has an excellent adhesion with a substrate and which is dense and good in flatness.

Another object of the present invention is to provide the cathode structure of a thin film battery which is more excellent electrochemically.

Another object of the present invention is to provide a thin film battery including a cathode structure with a $TiS_2$ thin film which has an excellent adhesion with a substrate and which is dense and good in flatness.

These and other objects are accomplished by a cathode structure for a thin film battery wherein a titanium disulfide thin film which is a cathode active material is disposed on a substrate, characterized in that a layer of titanium oxide is formed between said substrate and said titanium disulfide thin film.

DETAILED DESCRIPTION OF PREFERRED EMBODIMENTS

Some of the inventors have applied for a patent as to a technique in which a $TiS_2$ thin film is produced directly on a substrate by chemical vapor deposition (hereinbelow written as "CVD"), the resultant coated substrate being used as a cathode (Japanese Patent Application No. 57-158123). In this case, electrochemical characteristics superior to those of the thin film of the prior art prepared by pressing can be expected. It has been found out that, in the case of producing the $TiS_2$ thin film by CVD in this manner, an excellent cathode is obtained by employing a structure in which a titanium metal film is prepared on the substrate beforehand. This technique has already been applied for a patent (Japanese Patent Application No. 57-7595).

It cannot be said, however, that the cathode material fabricated as described above is sufficiently high in the adhesion with the substrate. It has sometimes been the case that exfoliation takes place between the substrate and the $TiS_2$ thin film, that the thin film cracks or that the battery undergoes self-discharge.

The present invention includes, in the cathode structure of a thin film battery, a layer of titanium oxide being formed between a substrate and a $TiS_2$ thin film which is a cathode active material. In this regard, the substrate can be an electrically insulating material (e.g., glass, quartz, etc.) or an electrically conducting material (e.g., silicon, titanium metal, etc.).

Figure 1:
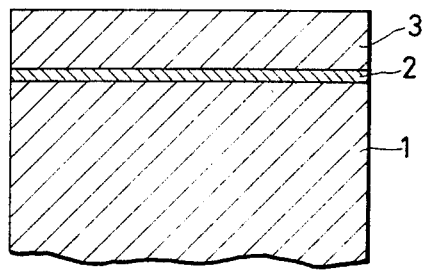
FIG. 1 is a schematic sectional view of a cathode structure for a thin film battery according to the present invention.

FIG. 1 is a setup view which schematically shows the cathode structure according to the present invention. In the Figure, numeral 1 designates a substrate, numeral 2 a layer of titanium oxide, and numeral 3 a thin film of titanium disulfide.

$TiS_2$ is known to be a fragile material and to be lower in the adhesion with the substrate than a titanium oxide, for example, $TiO_2$. In the present invention, therefore, the thin film of the titanium oxide is first prepared on the substrate, whereupon the $TiS_2$ thin film is formed thereon. In this case, when the $TiS_2$ thin film is prepared on the titanium oxide thin film by CVD employing $TiCl_4$ and $H_2S$ as source gases, the surface of the titanium oxide is sulfurized, and hence the adhesion between the titanium oxide and $TiS_2$ becomes very high. It is accordingly possible to eventually realize a cathode structure in which the adhesive power between the substrate and the $TiS_2$ thin film is high.

As the titanium oxide for use in the present invention, the aforementioned $TiO_2$ can be used, but $TiO$, $Ti_2O_3$ and $Ti_3O_5$ are also applicable. In general, these compounds have oxygen vacancies, and even such compounds, with oxygen vacancies, are applicable. For example, the titanium oxide can have a maximum amount of oxygen vacancies of about 0.1 (e.g., a maximum amount of oxygen vacancies of 0.1 atoms). As an example, for the aforementioned $TiO_2$, when taking into account the oxygen vacancies, the titanium oxide thin film can be $TiO_{(2-x)}$, $0 \leq x \leq 0.1$.

The thickness of the layer of the titanium oxide should preferably lie in a range from 0.1 μm to 5.0 μm inclusive, more preferably a range from 0.5 μm to 2.0 μm inclusive.

In the case of producing the $TiS_2$ thin film on the titanium oxide thin film by CVD employing $TiCl_4$ and $H_2S$ as the source gases, a favorable $TiS_2$ thin film can be formed under the production conditions of a source gas pressure of at most 30 kPa and a substrate temperature of 350°–650° C. Although a lower source gas pressure is better, it requires a longer time for the formation of the $TiS_2$ layer by CVD, so that a pressure of at least 0.001 kPa is favorable. The concentration ratio of $H_2S$ to $TiCl_4$ should preferably lie in a range of 3–20.

It has already been described that the surface of the titanium oxide thin film is at least partly sulfurized. In this regard, when only $H_2S$ is brought into contact with the titanium oxide at approximately 470° C. before the reaction between $TiCl_4$ and $H_2S$, the surface becomes blackish. It is also covered within the present invention to form the $TiS_2$ thin film on the thin film of the titanium oxide in such state.

According to the present invention, the cathode in which the substrate and the $TiS_2$ thin film being the active material adhere securely is produced as the cathode of the thin film battery, with the result that the electrochemical characteristics of the cathode are sharply improved. Such cathode is applicable to a lithium battery, a sodium battery, a copper battery, etc.

Now examples of the present invention will be described, along with a comparative example for comparisons:

EXAMPLE 1

On a substrate made of borosilicate glass and having a diameter of 20 mm and a thickness of 1 mm, a $TiO_2$ amorphous thin film having a thickness of 1 μm was prepared by sputtering. As sputtering conditions, a target of $TiO_2$ was used, at atmosphere gas consisted of $H_2$ and Ar at 10:90 and had a pressure of $3 \times 10^{-2}$ mmHg, a power level was 2.5 W/cm$^2$, and a sputtering time was 3 hours.

On the substrate formed with the $TiO_2$ thin film, a $TiS_2$ thin film was produced by CVD. As the conditions of the production, a source gas composition consisted of 0.6% of $TiCl_4$, 3.6% of $H_2S$ and the balance of Ar, a source gas flow rate was 2.3 ml/sec, a source gas pressure was 6 mmHg, a substrate temperature was 470° C., and a producing time was 3 hours. The thickness of the $TiS_2$ thin film thus produced was 20 μm.

Next, on the $TiS_2$ thin film, an $Li_{3.6}Si_{0.6}P_{0.4}O_4$ thin film (thickness 8 μm) was formed by sputtering. Further, four lithium thin films were formed thereon in the shape of dots, each being 4 mm square and 10 μm thick. Thus, four thin film batteries could be fabricated.

COMPARATIVE EXAMPLE

For comparison's sake, four thin film batteries were fabricated in conformity with quite the same procedure and conditions as in the foregoing Example, except that the $TiS_2$ thin film was produced directly on the borosilicate glass substrate by CVD without forming the $TiO_2$ amorphous thin film.

When the thin film batteries obtained by the foregoing Example and the Comparative Example were tested, the following results were produced: Among the four batteries of the Comparative Example fabricated by the method in which the $TiS_2$ thin film was formed directly on the borosilicate glass substrate, two exhibited self-discharge. In contrast, as to the four batteries of Example 1 fabricated by the method in which the $TiS_2$ thin film was formed after forming the $TiO_2$ thin film on the substrate beforehand, none exhibited self-discharge and all were good batteries. The difference is based on the fact that, in the latter batteries, the $TiS_2$ thin film could be securely produced on the substrate owing to the previous formation of the $TiO_2$ thin film on the substrate, so the $TiS_2$ thin film could have a smooth surface free from defects, such as cracks, and further, it was immune against various impacts in the processes subsequent to the production thereof.

While, in the foregoing Example, $TiO_2$ thin film prepared by sputtering was used, it is to be understood that a $TiO_2$ thin film prepared by any other process may well be used.

While, in the Example, $TiO_2$ was used as the titanium oxide, a similar effect is obtained even with another titanium oxide.

EXAMPLE 2

Figure 2:
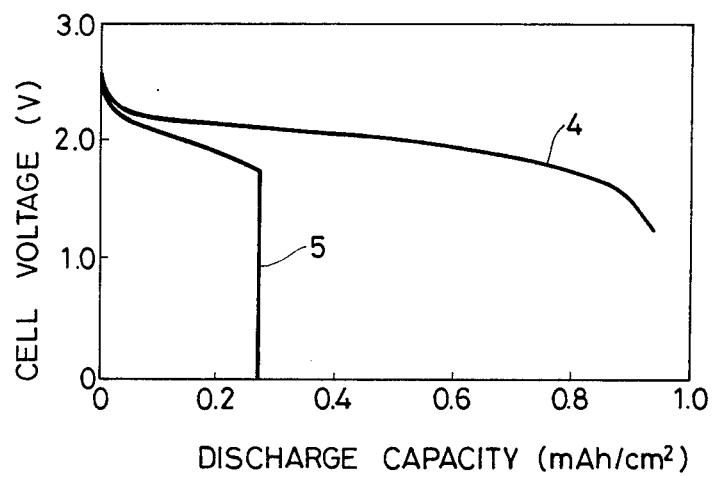
FIG. 2 is a graph for explaining the performance of a battery to which the present invention has been applied.

Among the batteries fabricated in Example 1 and Comparative Example, those that exhibited no self-discharge were subjected to galvanostatic discharge at a current density of 20 μA/cm$^2$ at 60° C. The results are shown in FIG. 2. The batteries of the present invention demonstrated excellent discharge characteristics as indicated by a curve 4. On the other hand, the characteristics of the batteries of the Comparative Example were as indicated by a curve 5.

The batteries after the discharge were observed with a scanning electron microscope. Then, in the batteries of the Comparative Example, the $TiS_2$ at the interface between the substrate and the $TiS_2$ film had exfoliated and cracked.

While we have shown and described several embodiments in accordance with the present invention, it is understood that the present invention is not limited to the previously disclosed embodiments, but is susceptible of numerous changes and modifications as known to one having ordinary skill in the art and we, therefore, do not wish to be limited to the details shown and described herein, but intend to cover all such modifications as are encompassed by the scope of the appended claims.

What is claimed is:

1. In a thin film battery comprising a cathode and anode sandwiching an electrolyte, the improvement comprising wherein the cathode structure comprises a titanium disulfide thin film as a cathode active material disposed on a substrate, with a layer of titanium oxide being formed between the substrate and the titanium disulfide thin film.

2. A thin film battery as defined in claim 1, said battery being selected from the group consisting of a lithium battery, a sodium battery and a copper battery.

3. A thin film battery as defined in claim 1, wherein said titanium oxide includes at least one member selected from the group consisting of TiO, $TiO_2$, $Ti_2O_3$, $Ti_3O_5$ and these compounds having oxygen vacancies.

4. A thin film battery as defined in claim 2, wherein the maximum amount of oxygen vacancies is 0.1.

5. A cathode structure for a thin film battery as defined in claim 1, wherein a thickness of said layer of titanium oxide falls within a range from 0.1 μm to 5.0 μm inclusive.

6. A thin film battery as defined in claim 1, wherein said titanium disulfide thin film is formed on said titanium oxide layer by chemical vapor deposition employing $TiCl_4$ and $H_2S$ as source gases under a reduced pressure of at most 30 kPa.

7. A thin film battery as defined in claim 6, wherein the temperature of the substrate during forming of the titanium sulphide thin film is 350°–650° C.

* * * * *